(12) United States Patent
Wieres

(10) Patent No.: US 6,770,591 B2
(45) Date of Patent: Aug. 3, 2004

(54) HONEYCOMB BODY, IN PARTICULAR CATALYST CARRIER BODY, FOR MOTORCYCLE OR DIESEL APPLICATIONS

(75) Inventor: Ludwig Wieres, Overath (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 09/992,285

(22) Filed: Nov. 19, 2001

(65) Prior Publication Data

US 2002/0035034 A1 Mar. 21, 2002

Related U.S. Application Data

(63) Continuation of application No. PCT/EP00/04885, filed on May 29, 2000.

(30) Foreign Application Priority Data

Jun. 2, 1999 (DE) .......................................... 199 25 390

(51) Int. Cl.$^7$ ................................................. B01J 21/04
(52) U.S. Cl. .................................. 502/439; 502/527.19
(58) Field of Search ............................. 502/439, 527.19

(56) References Cited

U.S. PATENT DOCUMENTS

| | | | | |
|---|---|---|---|---|
| 4,414,023 A | * | 11/1983 | Aggen et al. .................. | 75/124 |
| 4,602,001 A | | 7/1986 | Cyron ........................ | 502/439 |
| 4,985,388 A | * | 1/1991 | Whittenberger ............. | 502/439 |
| 5,055,145 A | * | 10/1991 | Ikegami et al. ............. | 148/285 |
| 5,302,355 A | * | 4/1994 | Fujikura et al. ............ | 422/180 |
| 5,395,599 A | * | 3/1995 | Koshiba et al. ............. | 422/180 |
| 5,422,083 A | * | 6/1995 | Sheller ...................... | 422/174 |
| 5,534,476 A | * | 7/1996 | Luoma et al. .............. | 502/335 |
| 6,099,809 A | * | 8/2000 | Foster et al. ............... | 422/180 |

FOREIGN PATENT DOCUMENTS

| | | |
|---|---|---|
| DE | 3823238 A1 | 1/1989 |
| DE | 4410744 A1 | 10/1995 |
| DE | 4418630 A1 | 11/1995 |
| EP | 0232793 A1 | 8/1987 |
| EP | 0497992 A1 | 8/1992 |
| EP | 0861916 A1 | 9/1998 |

OTHER PUBLICATIONS

Published International Application No. 94/13939 (Wieres et al.), dated Jun. 23, 1994.
Published International Application No. 92/09365 (Dalla Betta et al.), dated Jun. 11, 1992.

* cited by examiner

Primary Examiner—Stanley S. Silverman
Assistant Examiner—Jonas N. Strickland
(74) Attorney, Agent, or Firm—Laurence A. Greenberg; Werner H. Stemer; Ralph E. Locher

(57) ABSTRACT

A honeycomb body includes layered or wound sheet-metal layers at least partially structured to form passages through which exhaust gas can flow. The sheet-metal layers are formed of a special steel with 15 to 25% chromium, typical rare earths necessary for resistance to corrosion at high temperatures and an aluminum content of between 1 and 4.5%. Such a honeycomb body with sheet-metal layers having a thickness of more than 0.06 mm, preferably 0.01 to 0.12 mm, is suitable as a catalyst carrier body for the emission control systems of two-wheeled vehicles or motorcycles, despite its low aluminum content. Sheet-metal layers of this type are even suitable for use in the emission control systems of diesel vehicles with lower thicknesses since the temperatures are lower in these systems, in general below 800° C. Sheet-metal layers containing between 1 and 4.5% aluminum can be derived from other production processes before the aluminum content is increased with additional procedures. As a result, the materials are available very economically.

7 Claims, 1 Drawing Sheet

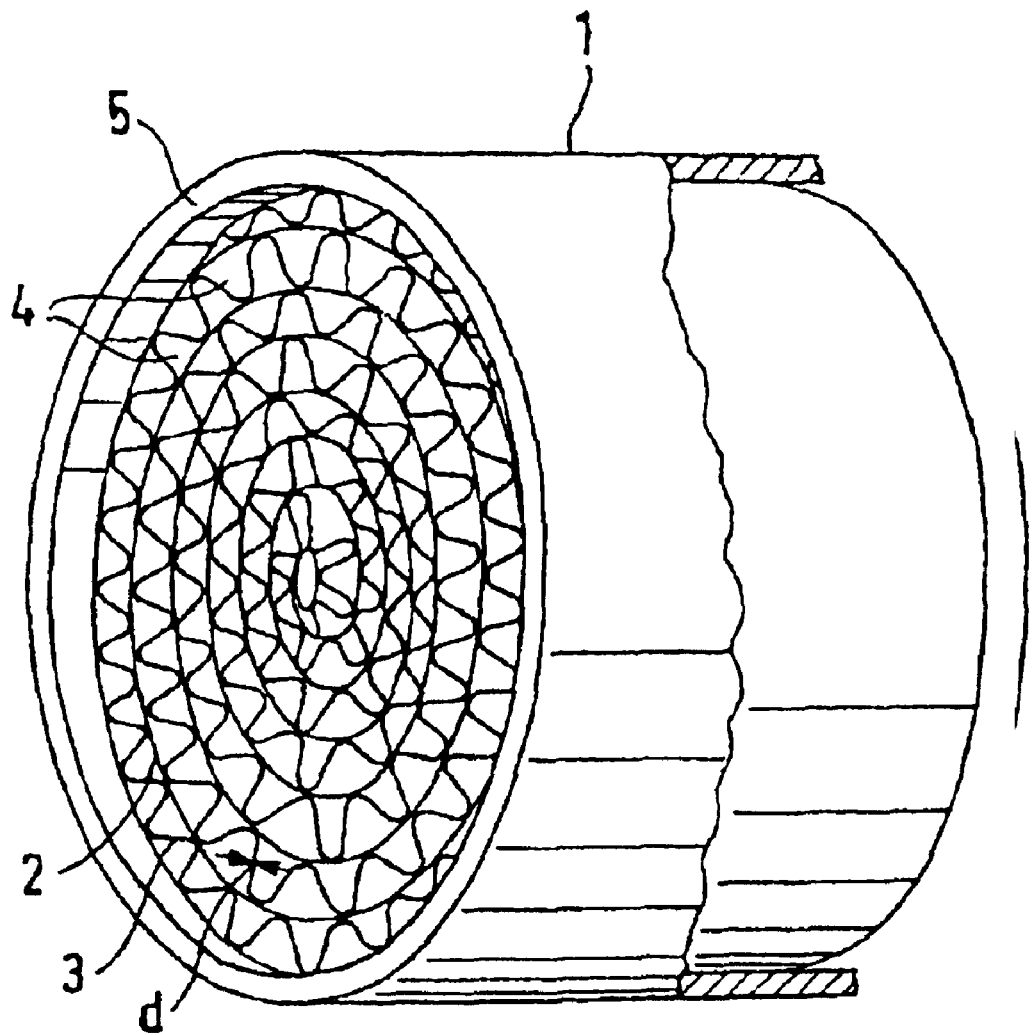

HONEYCOMB BODY, IN PARTICULAR CATALYST CARRIER BODY, FOR MOTORCYCLE OR DIESEL APPLICATIONS

CROSS-REFERENCE TO RELATED APPLICATION

This application is a continuation of copending International Application No. PCT/EP00/04885, filed May 29, 2000, which designated the United States.

BACKGROUND OF THE INVENTION

Field of the Invention

The present invention relates to a honeycomb body which is produced from layered or wound sheet-metal layers, as is used in particular as a catalyst carrier body for exhaust gas-cleaning systems. Such honeycomb bodies are typically produced from alternating layers of smooth and corrugated sheets or from alternating layers of differently structured metal sheets, by winding or layering. Honeycomb bodies of that type are described, for example, in International Publication No. WO 94/13939, corresponding to U.S. Pat. Nos. 5,729,902 and 5,618,501.

Since high temperatures and a corrosive environment typically prevail in exhaust gas systems of internal-combustion engines, heretofore alloys which are resistant to high-temperature corrosion, i.e. steel alloys with a high chromium and aluminum content, have substantially been used as materials for honeycomb bodies of that type.

Although it is generally known that stainless steels with an increasing aluminum content become more and more difficult to process, as a result of which the material has to be constantly re-annealed during a rolling process, a trend toward higher aluminum contents in metallic honeycomb bodies has nevertheless started to emerge. That can be learned, for example, from U.S. Pat. No. 4,602,001, in which it is attempted to compensate for the difficulty of processing steel with a high aluminum content by only adding the aluminum subsequently through the use of additional aluminum layers and diffusion.

German Published, Non-Prosecuted Patent Application DE 44 10 744 A1 has also revealed a trend toward high aluminum contents, although the electrical properties are to the fore in that case.

At the same time, there is a discernible trend toward thinner sheet-metal layers, since a lower mass in a catalyst carrier body has a beneficial effect on the cold-starting performance, and thin walls cause a lower pressure loss. However, the thinner the sheet-metal layers become, the less favorable the ratio of aluminum to surface area, which is the decisive criterion for the long-term corrosion resistance of the sheet-metal layers. That explains the trend toward increasing aluminum contents with relatively thin foils, even though it makes the rolling processes considerably more difficult.

The trend toward increasingly thin metal sheets in honeycomb bodies can also be learned, for example, from German Published, Non-Prosecuted Patent Application DE 44 18 630 A1.

In the meantime, however, it has emerged that there are special applications for metallic honeycomb bodies in which the above considerations do not apply. Those are, in particular, applications for the exhaust systems of motorcycles, in which the mechanical loads are so great that thicker foils have to be used. Moreover, there are applications for metallic honeycomb bodies in exhaust gas-cleaning systems of diesel engines, in which the temperatures that prevail are much lower than in the exhaust systems of spark-ignition engines. Therefore, the general considerations relating to other applications of honeycomb bodies do not necessarily apply for both applications.

SUMMARY OF THE INVENTION

It is accordingly an object of the invention to provide a honeycomb body, in particular a catalyst carrier body, for motorcycle or diesel applications, which overcomes the hereinafore-mentioned disadvantages of the heretofore-known devices of this general type and which can be produced at particularly low cost, for precisely these applications.

With the foregoing and other objects in view there is provided, in accordance with the invention, a honeycomb body, in particular a catalyst carrier body for exhaust gas-cleaning systems of motorcycles, comprising layered or wound sheet-metal layers at least partially structured to form passages through which exhaust gas can flow. The sheet-metal layers are formed of a stainless steel, have a thickness of more than 0.08 mm and have an aluminum content in percent by weight of between 6 and 12% multiplied by 0.02 mm divided by the thickness of the sheet-metal layers.

With the objects of the invention in view, there is also provided a honeycomb body, in particular a catalyst carrier body for exhaust gas-cleaning systems of motorcycles, comprising layered or wound sheet-metal layers at least partially structured to form passages through which exhaust gas can flow. The sheet-metal layers are formed of a stainless steel containing 15–25% (percent by weight) of chromium, 0.02 to 0.2% of rare earths, in particular yttrium and/or lanthanum and/or cerium, have between 1 and 4.5% of aluminum and have a thickness of more than 0.08 mm.

With the objects of the invention in view, there is additionally provided a honeycomb body acting as a catalyst carrier body for exhaust gas-cleaning systems of diesel vehicles, comprising layered or wound sheet-metal layers at least partially structured to form passages through which exhaust gas can flow. The sheet-metal layers are formed of a stainless steel containing 15–25% (percent by weight) of chromium, 0.02 to 0.2% of rare earths, in particular yttrium and/or lanthanum and/or cerium, and have between 1 and 4.5% of aluminum.

Recent developments in the production of metal sheets with high aluminum contents are based on multistage processes, in which first of all steel sheet with a relatively low aluminum content is rolled down to a defined thickness and then, in a second part of the process, the aluminum content is increased and the final thickness is achieved. The aluminum content can be increased by rolling-on aluminum foil or by hot-dip aluminizing or by aluminum dipping processes. Over the course of production processes of this type, rolling processes have been developed which enable steels with an aluminum content of at most 4.5% to be rolled at relatively low cost, in particular without frequent intermediate annealing.

The present invention makes use of the discovery that materials of this type, despite having an aluminum content of below 4.5 or even below 4%, are sufficiently resistant to high-temperature corrosion if they are used in honeycomb bodies with a thickness of the sheet-metal layers of more than 0.06 mm, preferably more than 0.08 mm. With sheet-metal layers of a thickness of this nature, the ratio of the total aluminum present to the surface area, for an aluminum content of 3 or 4%, is in fact better than for sheet-metal layers with a thickness of, for example, 0.03 mm and an aluminum content of 6%. Since aluminum diffuses very rapidly in steel at high temperatures, sufficient aluminum reaches the surface, even with relatively low aluminum contents in thick sheet-metal layers, to compensate for any damage to a protective oxide layer by forming further aluminum oxide.

There is an approximation formula for sheet-metal layers with a thickness of over 0.06 mm, according to which the aluminum content (in percent by weight) should be between 6 and 12%, in particular between 8 and 10%, multiplied by 0.02 mm divided by the thickness of the sheet-metal layers. In this way, the ratio of total aluminum present to the surface area in these metal sheets is always better than in a metal sheet with a thickness of 0.02 mm and an aluminum content of 6%.

The high mechanical loads in exhaust gas-cleaning systems of motorcycles and some applications require the use of metal sheets with a thickness of between 0.08 and 0.12 mm. Therefore, metal sheets with an aluminum content of from 1 to 4.5% are suitable for these applications. Steel sheets of this type typically have a chromium content of from 15 to 25% and a certain level of rare earths. The known conditions for these and other fractions in stainless steels also apply in the present case.

Naturally, relatively thick sheet-metal layers cannot be used to produce extremely fine structures, and consequently the honeycomb bodies according to the invention typically have between 200 and 600 cpsi (cells per square inch).

A particular economic benefit of the present invention is that the material for catalyst carrier bodies for motorcycles can be derived from another production process. This means that it can be made available very economically even if relatively small quantities of the material are required. Separate production of specific melts and the rolling of special foils for relatively small numbers of exhaust gas-cleaning systems of motorcycles could not be carried out similarly economically. However, since stainless steels with an aluminum content of 1 to 4.5% are in any case required for the above-mentioned multistage processes with a subsequent increase in the aluminum content, it is possible to use part of this material directly for the production of honeycomb bodies, especially since it is in any case produced with a suitable thickness as an intermediate product before the aluminum content is increased.

A similar consideration applies to exhaust gas-cleaning systems of diesel vehicles. In these systems, the temperatures which prevail are much lower than in the exhaust gas-cleaning systems of spark-ignition engines, so that for this reason a lower aluminum content and the associated lower resistance to high-temperature corrosion can be tolerated. In this case, although the metal sheets do not have to be as thick as in motorcycles for mechanical reasons, there is also no need for the ratio of the total aluminum content to the surface area to be as high. The foils with aluminum contents of between 1 and 4.5% which have been branched off from a production process as described above can therefore be rolled down further to a suitable thickness of, for example, 0.03 to 0.06 mm and can then be used without problems, despite the lower aluminum content, in exhaust gas-cleaning systems of diesel vehicles. In this case too, the fact that there is no need for separate production processes provides an enormous economic advantage.

Other features which are considered as characteristic for the invention are set forth in the appended claims.

Although the invention is illustrated and described herein as embodied in a honeycomb body, in particular a catalyst carrier body, for motorcycle or diesel applications, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a fragmentary, diagrammatic, partly broken-away and sectional perspective view of a typical metallic catalyst carrier body according to the present invention.

DESCRIPTION OF THE PREFERRED EMBODIMENTS

Referring now in detail to the single FIGURE of the drawing, there is seen a honeycomb body 1, which is produced from smooth sheet-metal layers 2 and corrugated sheet-metal layers 3 and is situated inside a tubular jacket 5. The sheet-metal layers 2, 3 are formed of metal sheets having a thickness d of from 0.08 to 0.12 mm. The sheet-metal layers 2, 3 form passages 4 through which exhaust gas can flow and which are preferably of such a size that the honeycomb body has between 200 and 600 cpsi. The sheet-metal layers are formed of a stainless steel containing 15 to 25 percent by weight of chromium, preferably 18 to 22%, typical levels of certain rare earths which are known to increase the resistance to corrosion and an aluminum content of 1 to 4.5%, in particular 2 to 4%.

The present invention allows particularly inexpensive production of catalyst carrier bodies for exhaust-cleaning systems of motorcycles or diesel vehicles, the quality of which is adapted to the surrounding conditions.

I claim:

1. A honeycomb catalyst carrier body for exhaust gas-cleaning systems of motorcycles, comprising:

layered or wound sheet-metal layers at least partially structured to form passages through which exhaust gas can flow, said sheet-metal layers formed of a stainless steel, having a thickness of more than 0.08 mm and having an aluminum content in percent by weight of between 6 and 12% multiplied by 0.02 mm divided by said thickness of said sheet -metal layers.

2. The honeycomb body according to claim 1, wherein said thickness of said sheet-metal layers is from 0.08 to 0.12 mm.

3. The honeycomb body according to claim 1, wherein said passages number between 200 and 600 cpsi (cells per square inch).

4. The honeycomb body according to claim 1, wherein said aluminum has a content of 2 to 4%.

5. The honeycomb body according to claim 1, wherein said sheet-metal layers are rolled.

6. The honeycomb body according to claim 1, wherein said sheet-metal layers are rolled and removed from a production process for producing hot-dip aluminized material before an aluminum content is raised.

7. A honeycomb body, comprising:

layered or wound sheet-metal layers at least partially structured to form passages through which exhaust gas can flow, said sheet-metal layers formed of a stainless steel, having a thickness of more than 0.08 mm and having an aluminum content in percent by weight of between 6 and 12% multiplied by 0.02 mm divided by said thickness of said sheet-metal layers.

* * * * *